(12) United States Patent
Amon et al.

(10) Patent No.: US 8,873,634 B2
(45) Date of Patent: Oct. 28, 2014

(54) METHOD AND DEVICE FOR MODIFICATION OF AN ENCODED DATA STREAM

(75) Inventors: Peter Amon, München (DE); Norbert Oertel, Landshut (DE); Agthe Bernhard, Unterhaching (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 484 days.

(21) Appl. No.: 13/141,873

(22) PCT Filed: May 7, 2010

(86) PCT No.: PCT/EP2010/002833
§ 371 (c)(1),
(2), (4) Date: Jun. 23, 2011

(87) PCT Pub. No.: WO2011/137919
PCT Pub. Date: Nov. 10, 2011

(65) Prior Publication Data
US 2012/0027093 A1 Feb. 2, 2012

(51) Int. Cl.
*H04N 7/12* (2006.01)
*G06K 9/36* (2006.01)
(Continued)

(52) U.S. Cl.
CPC ......... *H04N 7/467* (2013.01); *H04N 21/23406* (2013.01); *H04N 7/152* (2013.01); *H04N 21/242* (2013.01); *H04N 7/26941* (2013.01); *H04N 21/2662* (2013.01); *H04N 21/234381* (2013.01)
USPC ...................................... 375/240.16; 382/232

(58) Field of Classification Search
CPC ................ H04N 21/23406; H04N 21/234381; H04N 21/242; H04N 21/2662; H04N 7/152; H04N 7/26941; H04N 7/467; H04N 7/50; H04L 1/004; H04L 1/0057; H04L 1/0075; H04L 7/10; H04L 45/00; H04L 29/08072; H04L 29/06; H03M 13/1102; H03M 13/6312
USPC ................ 375/240.01–240.29; 370/230, 389; 714/752; 709/219, 230; 382/232
See application file for complete search history.

(56) References Cited

U.S. PATENT DOCUMENTS 5,881,245 A * 3/1999 Thompson .................... 709/219
7,307,989 B2 * 12/2007 Ofek et al. .................... 370/389
(Continued)

FOREIGN PATENT DOCUMENTS

GB 2396502 A 6/2004
WO 2008043002 A2 4/2008

OTHER PUBLICATIONS

International Preliminary Report on Patentability and Written Opinion for PCT/EP2010/002833 dated Nov. 13, 2012 (German Translation).

(Continued)

*Primary Examiner* — Gims Philippe
(74) *Attorney, Agent, or Firm* — Buchanan Ingersoll & Rooney PC (57) ABSTRACT

Embodiments provide methods for modification of an encoded data stream of data packets, wherein each data packet comprises one information bit. In the data stream, the information bits of sequential data packets display time intervals from each other which differ from desired time intervals and which are adapted to the desired time intervals by insertion of an artificially encoded, first data packet into the encoded data stream in the encoded domain temporally after a second data packet, or by removal of a fourth data packet present in the encoded data stream from the encoded data stream in the encoded domain.

18 Claims, 5 Drawing Sheets

(51) Int. Cl.
  *H04N 21/234* (2011.01)
  *H04N 7/15* (2006.01)
  *H04N 19/51* (2014.01)
  *H04N 21/242* (2011.01)
  *H04N 19/40* (2014.01)
  *H04N 21/2662* (2011.01)
  *H04N 21/2343* (2011.01)

(56) References Cited

U.S. PATENT DOCUMENTS

| | | | |
|---|---|---|---|
| 7,310,678 B2 * | 12/2007 | Gunaseelan et al. | 709/230 |
| 7,409,094 B2 * | 8/2008 | Wee et al. | 382/232 |
| 7,801,132 B2 * | 9/2010 | Ofek et al. | 370/389 |
| 2005/0008240 A1 | 1/2005 | Banerji et al. | |
| 2005/0169174 A1 * | 8/2005 | Apostolopoulos et al. | 370/230 |
| 2006/0107169 A1 * | 5/2006 | Vedantham et al. | 714/752 |
| 2009/0016623 A1 | 1/2009 | Higewake | |
| 2009/0154347 A1 | 6/2009 | Mamidwar et al. | |
| 2010/0091181 A1 | 4/2010 | Capps | |

OTHER PUBLICATIONS

International Preliminary Report on Patentability and Written Opinion for PCT/EP2010/002833 dated Nov. 13, 2012 (English Translation).

International Search Report dated Dec. 23, 2010 for PCT/EP2010/002833 (Form PCT/ISA/210) (German Translation).

Written Opinion of the International Searching Authority for PCT/EP2010/002833 (Form PCT/ISA/237) (German Translation).

Fung et al., "New Architecture for Dynamic Frame-Skipping Transcoder", IEEE Transactions on Image Processing, vol. 11, No. 8, Aug. 2002.

* cited by examiner

PRIOR ART

METHOD AND DEVICE FOR MODIFICATION OF AN ENCODED DATA STREAM

CROSS-REFERENCE TO RELATED APPLICATIONS

This application is the United States national phase under 35 U.S.C. §371 of PCT International Patent Application No. PCT/EP2010/002833, filed on May 7, 2010.

BACKGROUND OF THE INVENTION

1. Field of the Invention

Embodiments relate to methods for modification of an encoded data stream of data packets, wherein each data packet comprises one information bit in which the information of sequential data packets exhibit time intervals from each other which vary from desired time intervals. Furthermore, the invention relates to a device for modification of a data stream of data packets encoded in this manner.

2. Background of the Related Art

The time intervals of the information contained by sequential data packets differ from the desired time intervals between the information of these data packets due to different transit times of different data packets of a encoded data stream on the transmission path of the data packet from a sender to a receiver, which results in jitter in the data stream. The jitter in the data stream can result in flickering and jumpy playback on the receiver of the information contained in the data packets. When using a known jitter buffer to compensate for jitter, the greatest delay that is—present in the data stream—between two sequential data packets will be introduced into the encoded data stream, which leads to the data stream being delayed by the value of this greatest delay that is present in the data stream—between two sequentially encoded data packets. An unfavorable additional delay of the data stream can be largely avoided by using a transcoder instead of a jitter buffer. However, in a transcoder, all data packets present in encoded format are decoded and again re-encoded, which results in a reduced quality of the data content of the data packets and to a large expense for signal processing for the decoding and encoding of the data packets.

BRIEF SUMMARY OF THE INVENTION

Proceeding from the foregoing, the invention is based on the problem of creating a method and a device for modification of an encoded data stream of data packets which avoids the disadvantages of the prior art. In particular, a method and a device are to be specified for modification of an encoded data stream in which an additional delay of the data stream is largely avoided, wherein a high quality of the data content of the data packets being transmitted is ensured along with a small expense for signal processing.

According to the invented method for modification of an encoded data stream of data packets wherein each data packet comprises one information bit, the information bits of sequential data packets exhibit time intervals from each other which vary from desired time intervals and which are adapted to the desired time intervals by insertion of an artificially encoded, first data packet into the encoded data stream in the encoded domain temporally after a second data packet, or by removal of a fourth data packet present in the encoded data stream from the encoded data stream in the encoded domain.

BRIEF SUMMARY OF THE FIGURES

Additional exemplary embodiments and also advantages of the invention will be explained below with reference to the figures. For better illustration, a scale or correct proportional representation is not used in the figures. Unless specifically stated otherwise, the same reference numbers in the figures denote the same components with the same meaning. The figures show.

DETAILED DESCRIPTION OF THE INVENTION

Modification of the encoded data stream of data packets can effect a compensation of jitter in this data stream. Alternatively or additionally, modification of the encoded data stream can mean that the desired time intervals between data packets of an encoded data stream will correspond to the time intervals of data packets of an additional data stream. The adaptation of desired time intervals between data packets of an encoded data stream to the time intervals of data packets of an additional data stream is important in particular in video and audio conference technology.

It is an advantage if the artificially encoded, first data packet which comprises a first information bit, which references a second information bit which is comprised of the second data packet is generated in the encoded domain, and the artificially encoded, first data packet is inserted into the encoded data stream temporally after the second data packet in the desired time interval to the second data packet, if a third data packet following the second data packet is available in a time interval to the second data packet which is greater than the desired time interval. In this manner a compensation of jitter in the data stream can be effected through modification of the encoded data stream in the encoded domain.

In one preferred embodiment of the invention, the fourth data packet present in the encoded data stream, is removed from the encoded data stream in the encoded domain, if a fifth data packet following the fourth data packet is available in the desired time interval to the third data packet which precedes the fourth data packet. In this manner as well, a compensation of jitter in the data stream can be effected through modification of the encoded data stream in the encoded domain.

Due to the insertion of an artificially encoded data packet, or due to the removal of an encoded data packed in the encoded domain, in comparison to a solution with a jitter buffer, a reduced delay of the data steam can be achieved, since adjusting of the provided time interval between the sequential data packets can begin immediately after appearance of jitter, without having to wait for the largest delay present between sequential data packets. Compared to the method using a transcoder for compensation of jitter, the insertion or removal of data packets in the encoded domain means a less extensive intervention in the data stream, since the data packets which are not inserted or which are removed, are not decoded and encoded. The less extensive intervention in the data stream—in comparison to the method using a transcoder—results in a lesser delay of the data stream, since not all encoded data packets are fully decoded and then fully encoded again. Whereas in the method using a transcoder, the quality of the encoded data stream suffers due to the decoding and renewed encoding of each encoded data packet of the data stream; with a modification of the encoded data stream in the encoded domain for compensation of jitter, the information bits, also called "payloads," which comprise the encoded data packets that have not been artificially encoded, are unchanged, so that a high quality of data content and a reduced cost is ensured in the data packet being transmitted. In contrast to the method using a transcoder, in the invented method, at most, the packet header of an encoded data packet that has not been artificially encoded is changed.

In one preferred embodiment, the data packets are interim-saved in a jitter buffer temporally before the insertion of the artificially encoded, first data packet into the encoded data stream or before the removal of the fourth data packet from the encoded data stream; and the insertion of the artificially encoded, first data packet into the encoded data stream or the removal of the fourth data packet from the encoded data stream takes place such that the number of data packets interim-saved in the jitter buffer can be adjusted. In this manner an overrun in the jitter buffer—which results in an increased total delay of the data stream—and also an underrun of the jitter buffer—which means that no data packet is available for insertion or removal—can be avoided.

In this embodiment, the third data packet and the fourth data packet can be interim-saved in the encoded domain in the jitter buffer in such a manner that the third data packet in the data stream of encoded data packets is solely inserted temporally after the artificially encoded, third data packet in the desired time interval. Due to the presence of a plurality of encoded data packets in the jitter buffer, the last interim-saved data packet in the data stream can be solely preserved to reduce the delay of the data stream. The subsequently interim-saved data packet is skipped over, wherein the desired time interval to the last interim-saved data packet is ensured by preserving the data packet following the skipped data packet in the data stream.

The encoded data stream is preferably a video data stream, wherein each data packet of the encoded data stream comprises a portion of an individual video image and the artificially encoded, first data packet comprises a portion of an individual video image which comprises the information of the individual video image of the second data packet without motion vectors and/or transformation coefficients. The video data stream according to this embodiment of the invention is present when each data packet of the encoded data stream comprises an individual video image and the artificially encoded, first data packet comprises an individual video image, that comprises the information of the individual video image of the second data packet without motion vectors and/or transformation coefficients. Due to the absence of motion vectors and/or transformation coefficients in the information bit in the individual video image of the artificially encoded, first data packet, this data packet has a reduced memory requirement in comparison to the individual video image of the second data packet.

It is an advantage that each data packet of the video data stream comprises a portion of an individual video image encoded according to one of the video coding standards H.264/AVC, H.263 or MPEG-4 Visual, wherein the artificially encoded, first data packet comprises a portion of an individual video image which is composed of skipped macroblocks. This embodiment is present when each data packet of the video data stream comprises an individual video image encoded according to one of the video coding standards H.264/AVC, H.263 or MPEG-4 Visual, wherein the artificially encoded, first data packet comprises a portion of an individual video image which is composed of skipped macroblocks. The skipped macroblocks can be created in the video coding standards H.264/AVC by setting the macroblock mode to "skip." The reference to these skipped macroblocks is the first individual video image of the reference image list or is another, already encoded individual video image. Motion vectors and prediction error transformation coefficients, also known as transformation coefficients in short, are not transferred to the skipped macroblocks from the first, individual image of the reference image list. Thus the required memory space for the artificially encoded individual images is reduced in comparison to the memory space needed for the first individual video image of the reference image list.

A deblocking filter in the decoding loop is preferably switched off during the generation of the artificially encoded, first data packet in order to ensure the creation of a data packet with a data content of high quality, in comparison to the quality of the data content of the second data packet.

The artificially encoded, first data packet (P2') comprises preferably a portion of the individual video image (B2') which is inserted as individual, non-reference image or as individual reference image. This embodiment covers the case when the artificially encoded, first data packet comprises an individual video image which is inserted as individual, non-reference image. Even if the inserted, artificially encoded individual image is not a high quality copy of the original image, no deterioration in image quality will occur in the individual image following the artificially encoded, inserted individual image, since the prediction of this individual image is not changed by the insertion of the artificially encoded, individual image. In addition, the prediction structure must not be changed by the insertion of a non-reference image. Furthermore, in the case of an entirely filled reference image buffer which contains the reference image list, no reference image will be lost due to the insertion of an artificially encoded, individual image because the newly inserted image B2' is not saved in the reference image buffer. During video mixing it is an advantage if the encoded, first data packet comprises an individual video image that is inserted as individual reference image. For example, through the insertion of an additional individual reference image into a first image sequence of a video data stream, the prediction structure of this data stream can be adapted to an additional, existing prediction structure of a second video data stream which is to be mixed with the first video data stream.

In one preferred variant of the invention in which the encoded data stream is a video data stream, the fourth data packet removed from the video data stream comprises a portion of an individual, non-reference image. This embodiment includes the case when the fourth data packet removed from the video data stream is an individual, non-reference image. Upon removal of a data packet from the data stream which comprises an individual non-reference image, the prediction structure of the data packets remaining in the data stream is not changed.

In the case of a linear prediction structure, preferably only one data packet with a portion of the last individual video image of a group of pictures is removed from the video data stream, wherein the case in which only one data packet with the last individual video image of a group of pictures is removed from the video data stream is included. If a data packet comprises only a portion of the last individual video image of a group of pictures, then it is an advantage that all data packets be removed from the video data stream that cover only a portion of the last individual video image of a group of pictures. In the case of a hierarchical prediction structure, it is an advantage to remove a data packet with a portion of an individual video image from the lowest time level from the video data stream, wherein the case in which a data packet with an individual video image is removed from the lowest time level in the video data stream is included. If a data packet comprises, only a portion of an individual video image from the lowest time level, then it is an advantage that all data packets be removed from the video data stream which include only a portion of an individual video image from the lowest time level.

The function of an adaptive jitter buffer is executed in an additional, favorable embodiment of the invention in which the insertion and removal of data packets occurs in a dynamic manner.

Advantages are seen in particular when adapting the sampling rate of two video data streams during video mixing, because the desired time intervals of a second video data stream thereby correspond to the time intervals between sequentially encoded individual images of a first video data stream in which a first individual video image of the artificially encoded, first data packet of the second video data stream is mixed with a first individual video image of an encoded data packet of the first video data stream to obtain an individual video image. Thus in a favorable manner, in the case that the second video data stream has a lower sampling rate than the first video data stream, the artificially encoded, first individual video image is inserted into the second video data stream with the lower sampling rate (with respect to the first video data stream) in such a manner that the second video data stream with the inserted, artificially encoded, first individual video image will have the sampling rate of the first video data stream.

The invention further relates to a device, in particular to implement the method of one of claims 1 to 13, for modification of an encoded data stream of data packets, wherein each data packet comprises one information bit wherein the information of sequential data packets exhibit time intervals from each other that vary from desired time intervals and that are adapted to the desired time intervals, wherein the device comprises means for insertion of an artificially encoded, first data packet temporally after a second data packet into the encoded data stream in the encoded domain, and/or means for removal of a fourth data packet (P4) present in the encoded data stream, from the encoded data stream in the encoded domain.

Preferably, the device is connected upstream to a jitter buffer in which the encoded data packets can be interim-saved, and the means for insertion of the artificially encoded, first data packet into the encoded data stream and/or for removal of the fourth data packet from the encoded data stream are designed so that the number of data packets (P1, P2, P3, P4, P5) interim-saved in the jitter buffer (JB) is adjustable. With a device of this kind an overrun in the jitter buffer—which results in an increased total delay of the data stream—and also an underrun of the jitter buffer—which means that no data packet is available for insertion or removal—can be avoided.

Now the appearance of jitter will be explained on the basis of FIG. 1. Known examples for method of compensation of jitter in a data stream are presented in FIGS. 2, 3 and 4. Exemplary embodiments of the invention will be described based on FIGS. 5 to 13. The appearance of jitter which is produced due to different transit times for different data packets while passing through a net or network, will be explained using the example of a transmission path for encoded data packets from a sender to a receiver. Encoded data packets P1, P2, P3, P4, P5 of an encoded data stream are transmitted from a sending apparatus, hereinafter briefly called the sender S, after passing through a net or network N to a receiving apparatus, hereinafter briefly called the receiver R. The data packets P1, P2, P3, P4, P5 can contain information of differing content. Possible information contained by the data packets is audio information, image or video information, wherein basically any type of time sequential information can be contained in the data packets. Video information can be present, in particular, in the form of individual images. But for simplicity, it will be assumed below that the information of sequential data packets P1, P2, P3, P4, P5 has desired time intervals from each other which correspond to the desired time intervals d1 of sequential data packets P1, P2, P3, P4, P5. This assumption will apply, for example, when each data packet contains an individual video image. Other organization of the individual video images as data packets P1, P2, P3, P4, P5, for example, in the case when an individual video image is divided into several data packets P1, P2, P3, P4, P5, are covered by the following embodiments of the invention. An organization of an individual video image into several data packets is advantageous when a specified memory size may not be exceeded for the information of the data packet in a network and the memory size of an individual video image exceeds the specified memory size.

Figure 1:
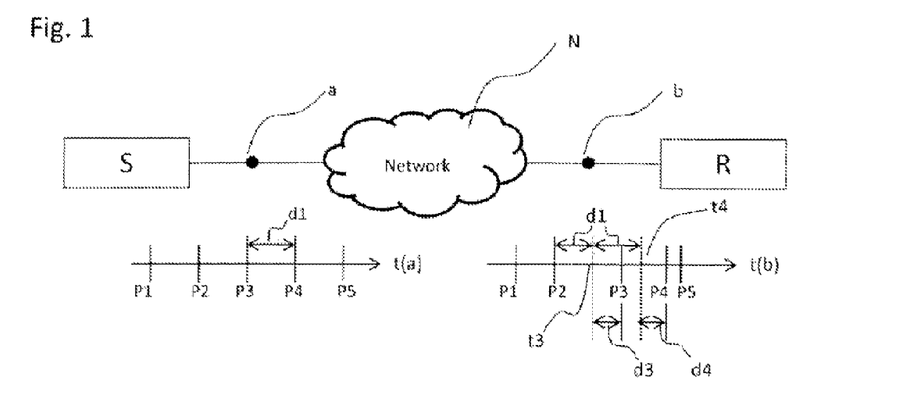
FIG. 1 time progression of encoded data packets on a transmission path from a sender to a receiver, before entry to a network and after exit from the network, FIG. 2 time progressions of encoded data packets on a transmission path from a sender to a receiver, before entry to a network and after exit from the network and after exit from a jitter buffer, and FIG. 3 time progressions of encoded data packets on a transmission path from a sender to a receiver, before entry to a network and after exit from the network and after outlet from a transcoder which comprises a decoder, an image reservoir and an encoder, and FIG. 4 a transmission path from a sender to a receiver in which—after the encoded data packet exits from a network—a jitter buffer is arranged in the transmission path before entry to the transcoder shown in FIG. 3, and FIG. 5 time progressions of encoded data packets on a transmission path from a sender to a receiver, before entry to a network, after exit from the network and after outlet from a device for compensation of jitter in the encoded domain, in a first embodiment of the invention, and FIG. 6 a transmission path from a sender to a receiver, wherein the encoded data packets—after exiting from the network and before entry into the device for compensation of jitter in the encoded domain—pass through a jitter buffer which is arranged in the transmission path between the network and the device for compensation of jitter in the encoded domain, in an additional embodiment of the invention, and FIG. 7 a comparison of the time progressions of the encoded data packets before entry to the network and after exiting from the jitter buffer shown in FIG. 2, after exiting from the transcoder shown in FIG. 3 and FIG. 4, and after exiting from the device for compensation of jitter in the encoded domain shown in FIG. 5 and FIG. 6, and FIG. 8 schematic series of pre-calculated images before an insertion, after an insertion as reference image and after an insertion as non-reference image in a linear prediction structure, and FIG. 9 schematic series of pre-calculated images before an insertion and after the insertion in a hierarchical prediction structure, and FIG. 10 schematic series of pre-calculated images before a removal and after a removal from a linear prediction structure, and FIG. 11 schematic series of pre-calculated images before a removal and after a removal from a hierarchical prediction structure, and FIG. 12 a schematic arrangement of a mixing of encoded macroblocks, wherein macroblocks are mixed from a first video data stream with skipped macroblocks from a second video data stream, and FIG. 13 schematic series of pre-calculated images from a first video data stream and a second video data stream before resampling and mixing and after the resampling and mixing.

The time sequence of data packets P1, P2, P3, P4, P5 before the data packets enter into the network N at location 'a' are illustrated on a time scale t(a) in FIG. 1. In the example shown in FIG. 1, the sender S sends the data packets at a desired time interval d1 between sequential data packets. In the case of a video transmission, the time interval between sequential data packets is the reciprocal value of the sampling frequency, also called "sampling rate," wherein it is assumed that an individual video image is composed each of one data packet P1, P2, P3, P4, P5 and a constant data packet length is present which corresponds to the time interval between sequential data packets:

$$T_{packet} = 1/f_s \text{ with}$$

$T_{packet}$=time interval between sequential data packets and $f_s$=sampling frequency.

After passing through the network, the data packets P1, P2, P3, P4, P5 at point b before arrival at the receiver R have a time sequence by which the data packets P3 and P4 are delayed with respect to data packets P1 and P2. Due to an increasing delay upon passing through the network N, in comparison to data packets P1 and P2, the data packet P3 has a position which is shifted by the time interval d3 with respect to its intended position t3 in the particular time interval, which is also called the desired interval d1. Data packet P4 is shifted by the time interval d4 with respect to its intended position t4, which is two intended time intervals d1 away from the position of data packet P2. Therefore, with respect to its intended time position, data packet P3 has a time delay d3 and data packet P4 has a delay d4 to its time position. Data packet P5 has the intended time interval d1 to the intended time position t4 of data packet P4. Therefore, the intended time interval d1 between data packet P4 and data packet P5 is reduced by the delay d4 of data packet P4. Data packets P3 and P4 have lost their relative time linkage with respect to the preceding data packets P1 and P2 and with respect to the following data packet P5 during the transmission through the network N. Now if data packets P1, P2, P3, P4, P5 represent video data packets, then a decoding and playback without associated intervention for compensation of the different transit times of the data packets P1, P2, P3, P4, P5, leads to a flickering and jumpy playback of the video whose information is contained in the video packets.

Without leaving the generalized nature of the timing conditions illustrated in FIG. 1, in the example which is illustrated in FIG. 1, for a simple explanation of jitter, it is assumed that the time interval between sequential data packets is constant and the packet length of each data packet P1, P2, P3, P4, P5 is constant. However, it is not necessary that the data packets have either a uniform time interval or a constant packet length. Instead, the data packets can have any particular time intervals from each other and have any particular packet lengths, provided the different time intervals of the data packets to each other and the resulting different packet lengths of the data packets are defined. In the time intervals between sequential data packets and defined packet lengths determined in and/or by the sender S, it is possible for the receiver R—after a decoding of the data packets P1, P2, P3, P4, P5 transmitted from the sender to the receiver—to playback these data packets without a flickering and jumpy playback, which is also called jitter.

Figure 2:
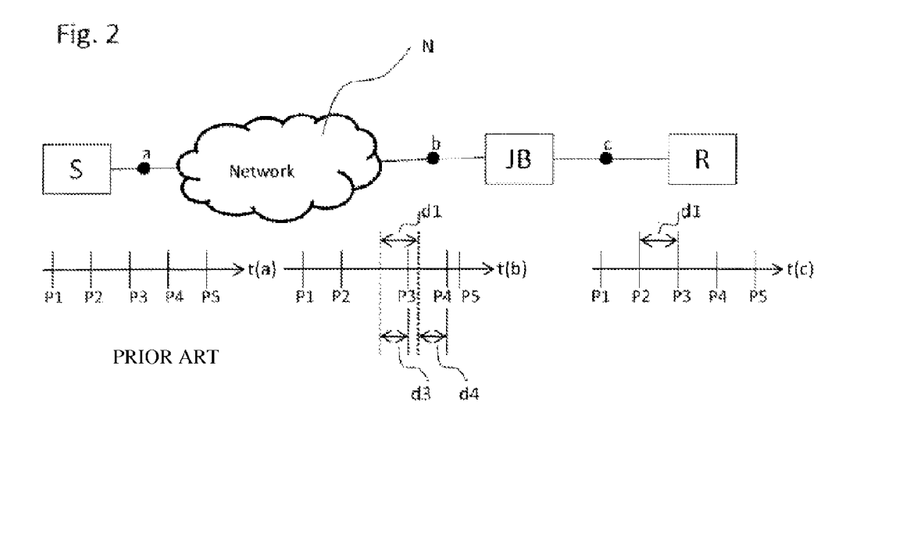

FIG. 2 shows a first, prior art method for compensation of jitter based on different transit times of different data packets as they pass through a network, also called "delay jitter." Between the sender S and the receiver R there is a jitter buffer JB, and the data packets P1, P2, P3, P4, P5 pass through the jitter buffer JB after their exit from the network N and before their entry into the receiver R. After exiting from the network N and before the data packets P1, P2, P3, P4, P5 enter into the Jitter Buffer JB, data packets P3 and P4 each have a time interval d3, d4 to their intended time positions t3, t4, as illustrated in FIG. 1. In the jitter buffer JB, which is used for data packets with audio, image, or video information, the data packets P1, P2, P3, P4, P5 entering into the jitter buffer JB are saved for a specific time which is also called the buffer delay. Due to the saving of data packets for a particular time it is possible to send the data packet P1, P2, P3, P4, P5 in the intended time sequence with the time interval d1 between sequential data packets to the receiver R. In this manner the intended time sequence is produced with the intended time interval d1 between sequential data packets.

One disadvantage of this method shown in FIG. 2 resides in the delay of the data packets associated with the jitter buffer JB. In the case that different data streams are to be mixed which contain the particular data packets P1, P2, P3, P4, P5 and which are allocated to one jitter buffer JB, then the data packets which have passed through the jitter buffer JB are delayed by a value which corresponds to the delay jitter of the data stream with the greatest delay jitter. Therefore, the delay of all data packets being mixed will be increased to the value of the data stream with the greatest delay jitter. The result is a delay of the data packets of all other entering data streams to that delay associated with the data stream with the greatest delay jitter. In real-time applications, such as audio or video conferencing, the high degree of delay of the data packets due to the video data stream with the greatest delay jitter will hinder communication between the participants in the audio or video conference.

Figures 3, 4:
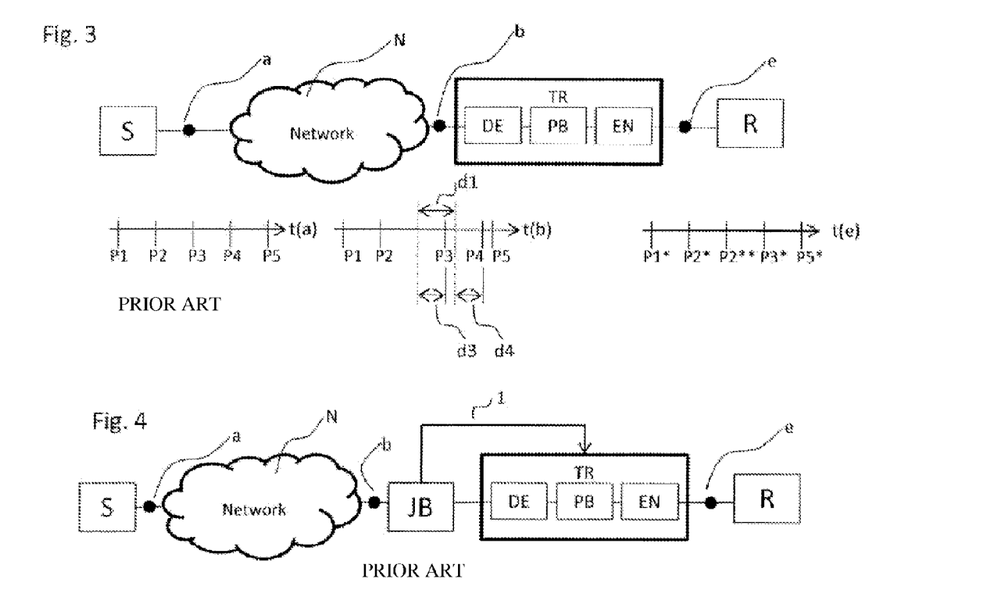

One additional, prior art solution intended specifically for video applications for correction of different delays of different data packets when the data packets pass through a network N, is illustrated in FIG. 3.

As is illustrated in FIG. 1 and FIG. 2, the data packets P3 and P4 each have a time delay d3, d4 to their intended time positions t3, t4 after passing through the network N. After passing through the network N and before entering the receiver R, the data packets P1, P2, P3, P4, P5 pass through a transcoder TR which contains a decoder DE, an image memory PB and an encoder EN. In the example shown in FIG. 3, it is assumed that each of the data packets P1, P2, P3, P4, P5 comprises an individual video image which contains the information of this individual video image needed for playback of a video data stream. In the method shown in FIG. 3 for processing of video data streams, the video data entering the transcoder TR is decoded in the decoder DE, then interimsaved in the image memory PB and subsequently encoded in the encoder EN. After the decoding, interim-saving and encoding of the video data streams—which are each contained in each of the data packets P1, P2, P3, P4, P5—these video data streams are present in the form of decoded and subsequently re-encoded individual images in the data packets P1*, P2*, P3*, P4*, P5*. The decoding in the decoder DE, the interim-save in the image memory PB and the encoding in the encoder EN is indicated at an asterisk * in the data packets shown in FIG. 3. At that time when the data packets P1*, P2* are to be encoded, the original data packets P1 and P2 present in the decoder EN corresponding to the data packets P1* and P2* are already in decoded format and are available in the image memory PB for coding. Due to the time delay d3 of data packet P3 at its intended time position t3, at the time of encoding of data packet P3* the decoded data packet P3, or stated more correctly, the decoded image which is contained by packet 3, is not available in the intended time interval d1 to the data packet P2. Therefore, the content of data packet P2 is encoded once again as data packet P2, because in contrast to data packet P3—at the time of encoding of the data packet as necessary to maintain the intended time interval d1—data packet P2 is saved in the image memory PB. In a manner similar to data packet P3, the decoded version of data packet P4 likewise is not available in a timely manner for encoding. Therefore, the data content of data packet P3, which is present in image memory PB after exiting of data packet P2 from the encoder EN, is encoded in the form of data packet P3*. Then finally, data packet P5* is encoded after the decoded data packet P5 is available in a timely manner for encoding. The data content of data packet P4 is not encoded again and passed on to the receiver R. As is illustrated at location 'e' in FIG. 3, before arrival in the receiver R, the data packets P1*, P2*, P2**, P3*, P5* have the intended time interval d1 from each other, wherein the data content of data packet P2 is present two times and the data content of packet P4 is not present in the time progression t(e). Indeed, owing to the double presentation of the data content of data packet P2 and the absent presentation of data content of data packet P4, a flickering and jumping playback in the form of a jitter in the playback of the video data stream—which includes the single images contained in data packets P1, P2, P3, P4, P5—can occur to a minor extent. However, through the method illustrated in FIG. 3, by means of transcoder TR the total transmission delay of the data packets between the sender S and the receiver R after the data packets pass through the transcoder TR is reduced in comparison to the method shown in FIG. 2 by means of jitter buffer JB.

The method illustrated in FIG. 3 using transcoder TR is used in multipoint conference units (MCU) in which a plurality of video input data streams are being mixed. Mixing of the input video data streams takes place by means of a decoding of all input video data streams, a mixing of these video data streams in the uncompressed pixel domain and by encoding of the newly arranged individual video image. In addition, before mixing of the input video data streams occurs in the uncompressed pixel domain, it is possible that the decoded individual video image of the input video data streams are scaled. If a first video data stream does not contain a current individual video image owing to delay jitter to permit timely mixing with the individual video image of a second video data stream, then the individual video image of the video data stream preceding the missing, current individual video image of the first video data stream can be used for mixing and encoding, because it is saved in image memory PB right after the decoding. If two or more individual images of the input video data stream are present in decoded format in the transcoder TR—due to multiple encoding of an individual video image—then before an additional, encoded individual video image leaves the encoder EN, the last individual image decoded in decoder DE, which is saved in the image memory PB, is used for the encoding, wherein the other decoded individual image (or the other decoded individual images) in the decoder DE is (are) disregarded.

The method of using a transcoder TR for correction of delay jitter exhibits the following, significant disadvantages:

1. Due to the complete decoding and encoding of all data packets of the video data stream or of the video data streams, transcoding is expensive in terms of the needed computational power. To implement the method by means of the transcoder TR therefore, high-cost hardware is needed which is incorporated into the method for decoding and coding.
2. The quality of the transmitted data of the video data stream is reduced by the transcoding, because for encoding already during passage through the network N, qualitatively reduced data content can be solely used—and not the original data content of the data packets with the individual images of the video data stream.
3. Due to the transcoding with a plurality of signal-processing steps, an additional delay is introduced into the video data stream.

FIG. 4 shows a transmission path from sender S to the receiver R device for compensation of jitter in the encoded domain of an additional, prior art example for compensation of jitter, in which a jitter buffer JB is arranged in the transmission path of the data packets after the encoded data packets exit the network N at location 'b' and before entry into the transcoder TR shown in FIG. 3. The methods for correction of delay jitter described in FIGS. 2 and 3 are combined with each other in the arrangement of jitter buffer JB and downstream transcoder TR between the network N and the receiver R as shown in FIG. 3. In the example shown in FIG. 4, a waiting loop (queuing delay) in the jitter buffer JB can be controlled by the use of the transcoder TR. Control of the queuing delay takes place by means of skipping the encoding of individual images in the image memory PB or by multiple encoding of the same individual images in the encoder EN. By skipping the encoding of individual images in image memory PB, the queuing delay is reduced. Due to a repeated encoding of the same images, the queuing delay in the jitter buffer JB is increased.

The queuing delay is defined as the average time that a data packet remains in the jitter buffer JB before it exits from the jitter buffer JB. The queuing delay is approximately the time needed for playback of the data packets saved in the jitter buffer JB.

Figure 5:
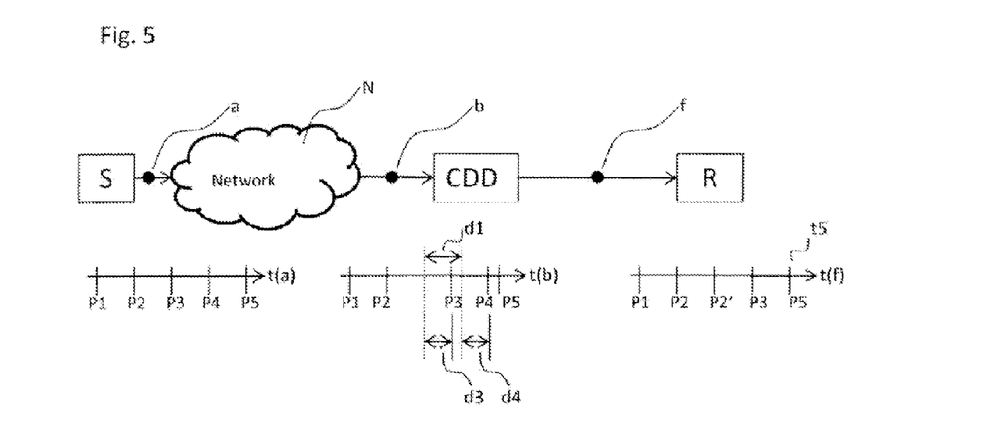

FIG. 5 illustrates time progressions t(a), t(b), t(f) of encoded data packets P1, P2, P3, P4, P5 on a transmission path from sender S to a receiver R according to one first embodiment of the invention. After exiting the network N and before entering the receiver R, the data packets pass through a device for compensation of jitter in the encoded domain, wherein the encoded domain of the data packets is also called the compressed domain. After the data packets exit from the network N and before the data packets enter the receiver R, the device for compensation of jitter in the encoded domain (Compressed Domain Dejittering: CDD) cleans the data packets from the delay jitter in the compressed domain, that is, the encoded data stream with its encoded data packets are cleaned from delay jitter. The method illustrated in FIG. 5 and also the arrangement illustrated in FIG. 5 will now be explained on the basis of data packets of a video data stream. In the event that a current individual video image for sending of the data packets P1, P2, P3, P4, P5 according to a specified time raster with desired time interval d1 between sequential data packets is not available, then an artificially encoded individual video image in the form of one or several artificially encoded data packets will be inserted into the encoded video data stream. The artificially encoded individual video image references the individual image preceding this individual image and repeats the data content of this preceding individual image. In the video coding standard H.264/AVC the artificially encoded individual video image can be generated by combining of the so-called skipped macroblocks. The skipped macroblocks in the video coding standard H.264/AVC are generated by setting the macroblock mode to "skip." The reference to these skipped macroblocks is the first individual video image of the reference image list or another already encoded individual video image. Motion vectors and prediction error transformation coefficients, also known as transformation coefficients in short, are not transmitted for the skipped macroblocks. Thus the memory size for the artificially encoded, individual images is reduced in comparison to the memory size of the first individual video image of the reference image list. The motion vectors for the skipped macroblocks are calculated using macroblocks neighboring the skipped macroblocks which are encoded temporally before the skipped macroblocks. Since all macroblocks in the individual video image has "skip" mode 5, the motion vectors in this calculation are set to zero. Skipped macroblocks are defined in the video coding standard H.264/AVC and also in the video coding standards H.263 and MPEG-4 Visual. However, the skipped macroblocks are not motion-compensated in video coding standards H.263 and MPEG-4 Visual. When using the device for compensation of jitter in the encoded domain, a deblocking filter should be provided in the decoding queue to produce a perfect copy of the preceding individual image. This can be determined implicitly by the algorithm, or can be signaled explicitly. Instead of the video data stream, the device for compensation of jitter in the encoded plane CDD can also process audio data streams, image data streams or another kind of time-sequential information.

In the exemplary embodiment illustrated in FIG. 5, the data packets P1 and P2 are available in a timely manner and are passed to the receiver R without any additional modification when passing through the device for compensation of jitter in the encoded domain CDD. Due to the time delay d3 from its intended timing t3, the data packet P3 arrives at a delay at the device for compensation of jitter in the encoded plane CDD. Therefore, the data packet P2' is encoded as a copy of data packet P2 by use of skipped macroblocks. The artificially encoded data packet P2' should not be inserted into the reference image list in order to keep existing reference images from being removed from the reference image list. Next, the data packet P3 is sent along to the receiver R—without change to data packet P3 by the device for compensation of jitter in the encoded plane CDD. In the method shown in FIG. 5 which uses the device for compensation of jitter in the encoded domain CDD, modifications to video coding elements of an artificially encoded data packet of the video data stream, for example, encoded transformation coefficients, mode information and motion vectors, are not necessary. Only the syntax at a higher level is modified, for example, the image sequence number of the data packet. The Real-Time Transport Protocol (RTP) uses image sequence numbers for detection of a loss of data packets. These image sequence numbers should therefore be re-written. This happens automatically when the device for compensation of jitter in the encoded domain CDD is used as RTP mixer and then the RTP-session of the sender S is terminated. If the data content of data packet P5 has dependencies on the data content of data packet P4, then at the time progression t(f) at location 'f' after the data packet exits from the device for compensation of jitter in the encoded domain CDD, the data packet P4 is not removed from the data stream, as shown in FIG. 5, but rather is passed along, since otherwise data packet P5 could not be decoded in the receiver R. If there are no dependencies of data packet P5 on data packet P4, then instead of data packet P4, data packet P5 as said data packet P5 passes through the device for compensation of jitter in the encoded domain CDD is passed along in order to reduce the transmission delay of the data stream. Due to the non-transmittal of data packet P4—as shown by a comparison of the time progression before entry into the device for compensation of jitter in the encoded domain CDD at location 'b' and after the data packet exits from the device for compensation of jitter in the encoded plane CDD at location T—data packet P4 is skipped over. By skipping over the first individual, non-reference image which corresponds to data packet P4 in the method shown in FIG. 5, the total delay of the data stream can be reduced. Afterward, the original time raster upon exit of the data packet from the sender S at location 'a' is regenerated with the intended time interval d1—as shown by the time progression t (f) at location 'f' after the data packet passes through the device for compensation of jitter in the encoded domain CDD and before the data packet enters the receiver R.

Figure 6:
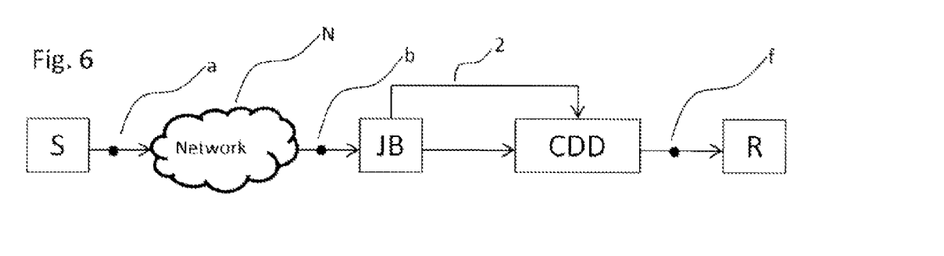

To control the queuing delay in a jitter buffer JB, the device for compensation of jitter in the encoded domain CDD can be combined with the jitter buffer JB. FIG. 6 illustrates another embodiment of the invention showing a transmission path of the encoded data packet from Sender S to the Receiver R, wherein the encoded data packet—after exiting the network N and before entry into the device for compensation of jitter in the encoded domain CDD—passes through a jitter buffer JB which is arranged in the transmission path between the network N and the device for compensation of jitter in the encoded domain CDD. Due to the arrangement of the jitter buffer JB in the transmission direction of the data packets in front of the device for compensation of jitter in the encoded domain CDD, the number of steps for insertion of artificially encoded data packets and the number of steps for their removal—also called 'skips'—of the data packets, can be reduced. For example, it may happen that a network delay in which all data packets of a data stream are delayed, and/or a network delay jitter in which the data packets are delayed with respect to each other, is greatly increased/will increase. In this case, the absence of or insufficiency of a jitter buffer, will mean that the data packet entering the device for compensation of jitter in the encoded domain CDD before beginning the network delay and/or the network delay jitter, would have to be inserted repeatedly into the data stream as artificially encoded data packet, which would result in a flickering and jumpy playback. A Jitter Buffer JB can smooth out the playback of the data packet. The fill level of the jitter buffer JB can be controlled by the insertion or removal of individual images of the data packet in the data stream by means of the device for compensation of jitter in the encoded domain CDD. By using a jitter buffer JB which the data packets pass through before entry into the device for compensation of jitter in the encoded domain CDD, it is possible that upon occurrence of a network delay and/or a network delay jitter, solely individual data packets/individual images are inserted or removed, so that the modification of the data stream is hardly noticed or is unnoticed upon playback in the receiver R. To do so, the jitter buffer JB sends information over a line 2 outside of the transmission path of the data packets from the device for compensation of jitter in the encoded domain CDD, about the currently determined network delay in the jitter buffer JB and/or about the currently determined network delay jitter in the jitter buffer JB, to the device for compensation of jitter in the encoded domain CDD. The fill level of the jitter buffer JB can be controlled by means of the insertions of an artificially encoded data packet and/or the removals, respectively, of a data packet from the data stream which occur in a given time interval in the device for compensation of jitter in the encoded domain CDD. In this way one can prevent an overrun of the jitter buffer JB which results in an overall increased delay of the data stream, and also an underrun of the jitter buffer JB, which results in no data packet/individual image being available to the device for compensation of jitter in the encoded domain CDD. With the configuration shown in FIG. 6 it is possible to counteract the following cases (and other cases) of occurrence of a network delay and/or a network delay jitter:

The network delay increases: Consequently, the fill level and thus the queuing delay in the jitter buffer JB decreases, since more images are being removed from the jitter buffer JB than before the increase in network delay, in order to maintain the intended time interval d1 between sequential data packets to the device for compensation of jitter in the encoded domain CDD. Data packets/individual images can be inserted by the device for compensation of jitter in the encoded domain CDD in order to maintain the fill level of the jitter buffer JB, within certain limits, proportional to the queuing delay.

The network delay decreases: Consequently, the fill level in the jitter buffer JB and thus the queuing delay increases, since in comparison to a time before a decrease in network delay, more images arrive in the jitter buffer JB than are required from the jitter buffer to maintain the intended time interval d1 between sequential data packets by the device for compensation of jitter in the encoded domain CDD.

A delay jitter in the network N increases: Filling of the jitter buffer JB is to be increased through the insertion of artificially encoded data packets/individual images.

The network delay jitter decreases: Filling of the jitter buffer JB is to be reduced by the device for compensation of jitter in the encoded domain CDD in order to reduce the delay of the data packets in the transmission of the data packets from sender S to receiver R, also called the total delay.

It should be noted that the network delay and the network delay jitter can be computed based on statistical data on the data packets entering the jitter buffer, for example, their timing. The calculation can be handled within the jitter buffer JB. The configuration shown in FIG. 6 can be viewed as a special case of the configuration shown in FIG. 5, wherein the jitter buffer JB in FIG. 6 has a negligible queuing delay of the data packets which are contained in the jitter buffer JB.

Figure 7:
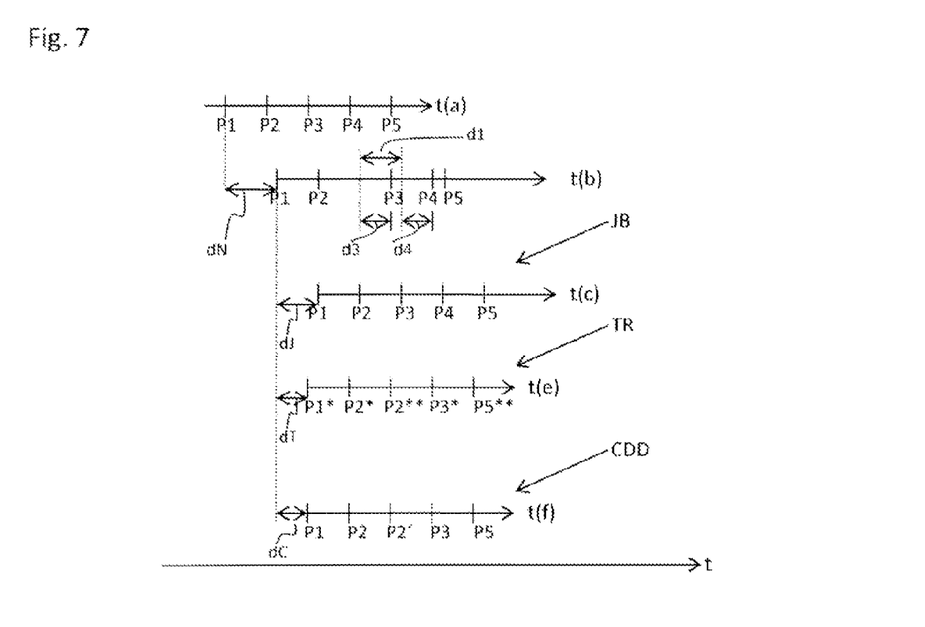

FIG. 7 presents a comparison of the time progressions of the encoded data packets before entry into the network N and after exiting from the jitter buffer shown in FIG. 2, after exiting from the transcoder TR shown in FIG. 3 and FIG. 4, and after existing from the device for compensation of jitter in the encoded domain CDD shown in FIG. 5 and FIG. 6. After exit of the data packets from the sender S and before their entry into the network N, the time progression t(a) at location 'a', is shifted in time by an (average) transmission delay dN to t(b), t(c), t(e) and t(f), wherein the locations b, c, e and f correspond to the locations b, c, e, f in FIGS. 1, 2, 3, 4, 5, 6. After occurrence of the transmission delay dN, the data packets P1, P2, P3, P4, P5 can be processed by the receiver R or by a component arranged between the sender S and the receiver R. As a component arranged between the sender S and the receiver R, a jitter buffer JB, a transcoder TR or a device for compensation of jitter in the encoded domain CDD can be used. To compensate for the delay jitter—which represents a special case of jitter—the jitter buffer JB must detect the total delay jitter occurring during transmission of the data stream with the encoded data packets P1, P2, P3, P4, P5. Therefore, the delay dJ occurring through use of the jitter buffer JB, turns out to be relatively large. In comparison to the delay dJ of data packets P1, P2, P3, P4, P5 caused by the jitter buffer JB, the transcoder TR and the device for compensation of jitter in the encoded domain CDD have additional means for compensation of delay jitter. Due to the possibility for insertion and/or removal of data packets from the data stream, in comparison to the delay dJ by the jitter buffer JB, the delay dT through the transcoder TR and dC that through the device for compensation of jitter in the encoded domain CDD is less.

Figure 8:
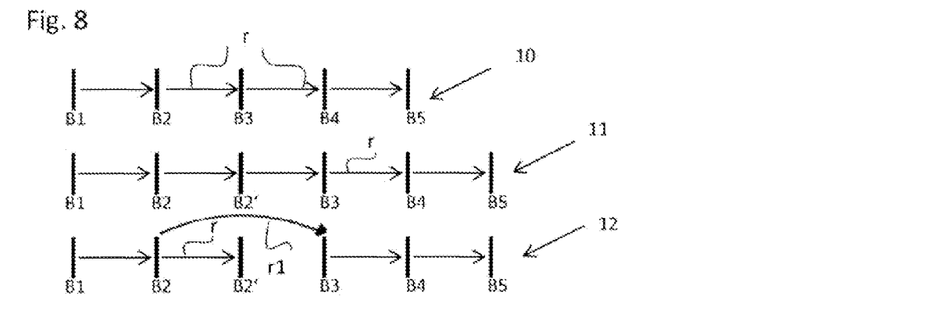

FIG. 8 shows schematic sequences 10, 11, 12 of images before an insertion 10, after an insertion as reference image 11, and after an insertion as non-reference image 12 in a linear prediction structure plotted against the time t (see arrow). The word "individual video image" will be replaced below by the word "image." As was explained in connection with FIGS. 5 and 6, for the case that a current image is not available for transmittal through the device for compensation of jitter in the encoded domain CDD, an artificially encoded image which represents the data content of the image preceding the artificially encoded image, is inserted into the data stream to maintain the intended time interval d1 between sequential images. If there are dependencies between the images of a video image sequence, then these dependencies between the images of a video image sequence should be retained. FIG. 8 shows the insertion of a pre-calculated image in the form of an artificially encoded individual video image in a linear prediction structure, also called IPPP. In an IPPP prediction structure, the first image of an image sequence—the intra-image B1—does not refer to the image preceding the intra-image B1. The images B2, B3, B4, B5 following intra-image B1, however, refer to the particular images B1, B2, B3, B4 preceding these images. Therefore, in the linear prediction structure 10—except for the intra-image B1—the image preceding each pre-calculated image is a reference image. In FIG. 8 the referencing is represented by an arrow r between the individual images of each image sequence B1, B2, B3, B4, B5. In contrast to FIGS. 1 to 3, 5 and 7, in FIG. 8 no encoded data packets P1, P2, P3, P4, P5, are illustrated, but rather pre-calculated images B1, B2, B3, B4, B5. Each of the data packets P1, P2, P3, P4, P5, can contain as information, one of the images B1, B2, B3, B4, B5 or each can contain a portion of one of the images B1, B2, B3, B4, B5. Before the insertion of the pre-calculated image B2', the image sequence 10 has a sequence of pre-calculated images in ascending order, beginning with intra-image B1. As is illustrated in the schematic sequence 11 of pre-calculated images after insertion of a pre-calculated image B2', the inserted, pre-calculated image B2' has the data content of its predecessor B2. Now if the video coding standard H.264/AVC is used, then the inserted, artificially encoded, pre-calculated image B2' can be composed exclusively of skipped macroblocks, as was explained above.

In the time sequence 12, a pre-calculated image B2' is inserted as non-reference image into the linear IPPP prediction structure of images B1, B2, B3, B4, B5 after the pre-calculated image B2. Since the artificially encoded individual video image B2' is a non-reference image, image B3 following the artificially encoded, pre-calculated image B2', does not reference the artificially encoded, pre-calculated image B2', but rather the pre-calculated image B2. The schematic sequence 12 illustrates the referencing of the pre-calculated image B3 to the pre-calculated image B2 by an arrow r1. Thus both the artificially encoded, newly inserted and pre-calculated image B2' and also the available, pre-calculated image B3 each reference the pre-calculated image B2. The insertion of a new image as non-reference image has several advantages:

Even if the newly inserted, artificially encoded and pre-calculated image B2' is not a high quality copy of the pre-calculated image B2, no deterioration of image quality occurs in the image B3 following the artificially encoded, newly inserted and pre-calculated image B2', since the time predictor (which denotes the referencing of image B4) of pre-calculated image B3 has not been changed by the insertion of the artificially encoded, pre-calculated image B2'.

The prediction structure must not be changed in any way by the insertion of a non-reference image. Even if the prediction structure turns out to be more comprehensive than illustrated in FIG. 8, for example, when using a plurality of different individual reference images, it is not necessary to change the reference indices, that is, the referencing to previously encoded images.

In the case of an entirely filled reference image buffer which contains the reference image list, through the insertion of the artificially encoded, pre-calculated image B2', no reference image will be lost since the newly inserted image B2' is not saved in the reference image buffer.

On the other hand, the insertion of an image composed exclusively of skipped macroblocks as individual reference image, has advantages during video mixing in the compressed domain. For example, through the insertion of an additional, individual reference image into a first image sequence of a video data stream, the prediction structure of this data stream can be adapted to the other existing prediction structure of a second video data stream which is to be mixed with the first video data stream.

To maintain the integrity of the linear prediction structure, the image preceding the pre-calculated image is declared as the reference image when the image preceding the pre-calculated image is a non-reference image B2' in the schematic sequence 12. Additional references may have to be performed in order to maintain the original prediction structures. For example, in schematic sequence 11 the artificially encoded, newly inserted and pre-calculated image B2' is inserted as reference image, wherein the pre-calculated image B3 referencing the pre-calculated image B2 before the insertion, now references the newly inserted, artificially encoded and pre-calculated image B2'.

Figure 9:
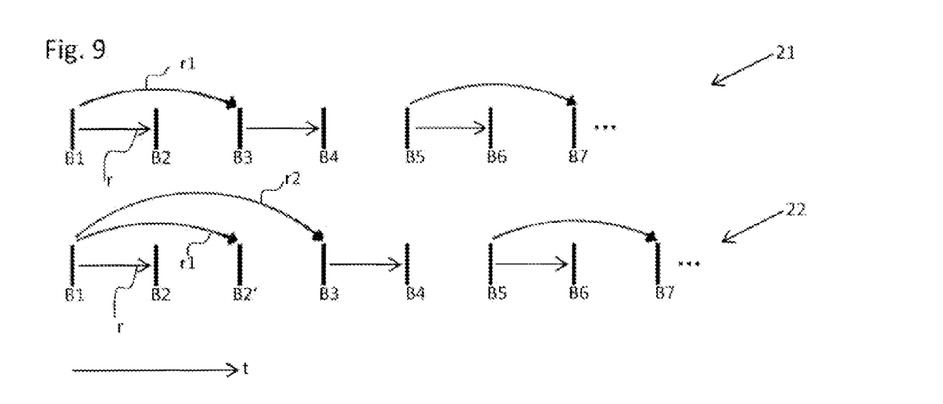

However, if the pre-calculated image B2 preceding the newly inserted, artificially encoded and pre-calculated image B2' cannot be declared as the reference image, for example because an overrun of the reference image buffer would occur upon declaration of the pre-calculated image B2 as reference image, then the non-reference image is repeated upon insertion of the newly inserted, artificially encoded and pre-calculated image. Since the reference image buffer has not been changed by the insertion of the newly inserted, artificially encoded and pre-calculated image, the prediction is implemented as for the preceding pre-calculated image. As an illustration FIG. 9 shows schematic sequences 21, 22 of pre-calculated images before the insertion 21 and after the insertion 22 for a hierarchical prediction structure, in which the image B2 preceding the inserted, pre-calculated image B2', is a non-reference image. In the case of schematic sequence 21, the pre-calculated image B3 does not reference the pre-calculated image B2, but rather references the pre-calculated image B1, as indicated by arrow r1. After the insertion of the artificially encoded, pre-calculated image B2' in the time sequence 22, both the newly inserted, artificially encoded and pre-calculated image B2' and also the pre-calculated image B3 following the pre-calculated image B2' each make reference to the pre-calculated image B1, as is illustrated by the time sequence 22 through the references r1 of B2' and r2 of B3. For a copy of the pre-calculated image B2 for the pre-calculated image B2' being inserted, only higher order data information, such as RTP, image sequence number and a time stamp of the pre-calculated image B2 is changed. The signal processing data content, such as coefficient, motion vectors and mode information, etc. of the artificially encoded, pre-calculated image B2' being inserted corresponds to that of the originally pre-calculated image B2. Therefore, in the insertion of a newly inserted, artificially encoded individual image as non-reference image, the data rate of this artificially encoded, pre-calculated individual image being inserted turns out to be greater than for a newly inserted, artificially encoded reference image which is composed exclusively of skipped macroblocks. Therefore it is advantageous in the case of a given prediction structure, to use individual images which are composed exclusively of skipped macroblocks, to reduce the transmission data rate, if this is possible.

As a comparison of the time sequences 11 and 12 in FIG. 8 with the time sequence 21 in FIG. 9 will show, the insertion of an artificially code, pre-calculated individual image B2' as non-reference image in the time sequence 12 will produce a hierarchical prediction structure from the linear prediction structure shown in the time sequence 10. In the case of a hierarchical prediction structure, in contrast to the time sequences 10, 11 shown in FIG. 8, a pre-calculated image B3 is available whose preceding, pre-calculated image B2 is a non-reference image, as illustrated in the time sequence 21.

As was already discussed in conjunction with FIG. 5, in the case that two or more individual images are available in the device for compensation of jitter in the encoded domain CDD for transmitted into the data stream of encoded data packets P1, P2, P3, P4, P5, the older of the images present in the device for compensation of jitter in the encoded level CDD, will be skipped in order to reduce the delay of the data stream. For example, the case may happen that—owing to a significant reduction in network delay—the desired time interval d1 between sequential data packets P1, P2, P3, P4, P5 will be reduced by half upon arrival of sequential data packets in the device for compensation of jitter in the encoded domain level CDD. In this case the data packet arriving prematurely in the device for compensation of jitter in the encoded domain level CDD can be removed from the data stream, without an artificially encoded data packet having been previously inserted into the data stream. The individual image which is contained by an encoded data packet, is removed from the data stream in the encoded domain.

Figure 10:
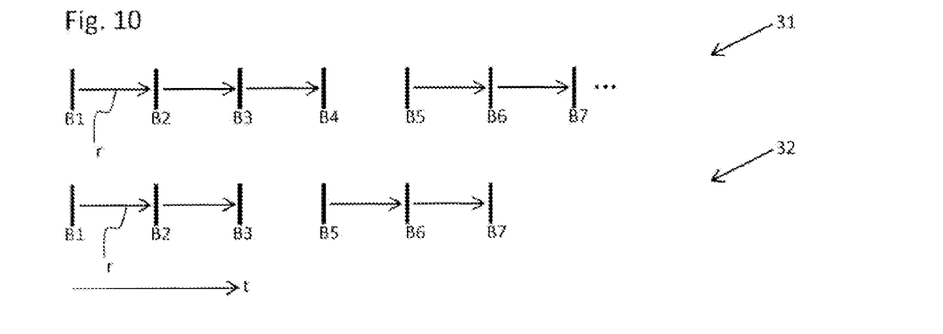
Figure 11:
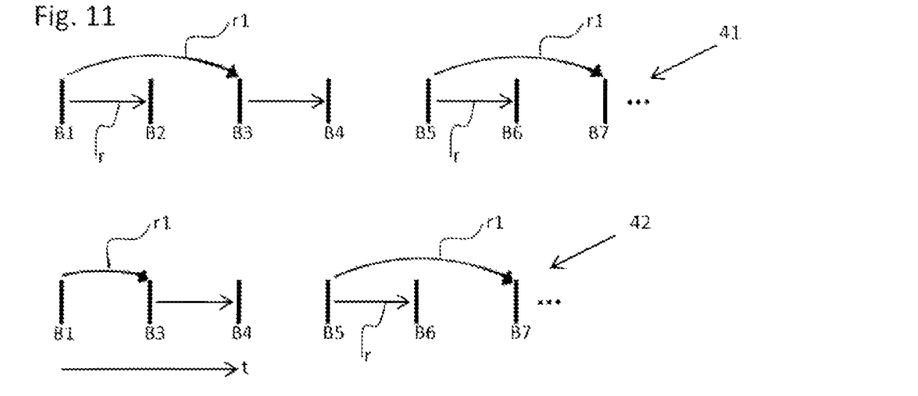

Upon removal of an individual image from the data stream, it is an advantage if the individual image being removed is not used for additional references. As an illustration, FIGS. 10 and 11 each show schematic sequences 31, 32 and 41, 42 of pre-calculated images from a linear prediction structure (FIG. 10) and from a hierarchical prediction structure (FIG. 11). FIG. 10 presents schematic sequences of pre-calculated images before the removal 31 and after the removal 32 from a linear prediction structure. As is evident from a comparison of the schematic sequences 31 and 32 in FIG. 10, from the linear IPPP prediction structure solely the last individual image B4 of the Group Of Pictures (GOP) is removed from the data stream of images B1, B2, B3, B4, B5, B6, B7. A group of pictures GOP is composed of pre-calculated images which each reference—except for the first image of the group of pictures—the image preceding the particular pre-calculated image of the group of pictures. Therefore, in the schematic sequence 31, the images B1, B2, B3, B4 and the images B5, B6, B7 each form individual groups of pictures. After removal of the pre-calculated image B4, the images B2 and B3 remaining in the data stream of schematic sequence 32 each make reference to the images B1, B2 preceding these images B2, B3, respectively.

In the hierarchical prediction structure shown in the schematic sequence 41 in FIG. 11, the individual images B4, B6, B8 form the particular, individual images at the lowest time level. The individual images B4, B6, B8 are non-reference images and can be removed from the data stream in a simple manner, since no following images reference these images B4, B6, B8. Since the quantity of individual images which can be skipped is greater in a hierarchical prediction structure than in a linear prediction structure—as is shown by a comparison of the schematic sequences 31 in FIG. 10 and 41 in FIG. 11 with respect to the easily removable non-reference images—it is advantageous with an available encoder to generate time-scalable data streams which display hierarchical prediction structures.

In one favorable embodiment, the invention provides for the removal exclusively of non-reference, individual images from the compressed and encoded video data stream in order to prevent a deterioration of image quality of the non-removed individual images. An additional, favorable embodiment of the invention provides that both the insertion of an artificially encoded data packet which contains an individual image, and also the removal of a data packet which contains an individual image, takes place dynamically. In this case, the device for compensation of jitter in the encoded plane performs the function of an adaptive jitter buffer.

Figure 12:
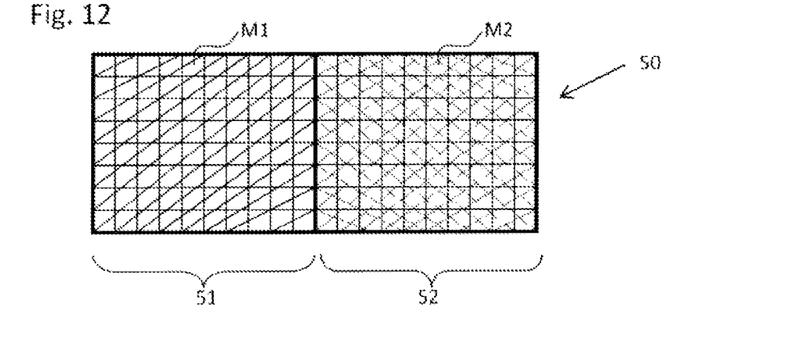

Compensation of jitter in the encoded domain, also called compensation of jitter in the compressed domain, can be combined with video mixing in the compressed domain, also called video mixing in the encoded domain. Mixing of video data streams at the macroblock level is described, for example, in WO 2009/049974 A2. In the event that a first video data stream which is to be mixed with a second video data stream, contains a delay jitter increased with respect to the second data stream, wherein an incoming individual image of the first video data stream is not available in time for combining of the currently mixed, individual output image, then the incoming individual image—which not promptly available—of the first video data stream will be replaced by an individual image which comprises exclusively macroblocks in the "skip" mode. As an illustration, FIG. 12 shows a schematic arrangement of a mixing 50 of encoded macroblocks M1, M2, wherein macroblocks M1 from a first video data stream 51 are mixed with skipped macroblocks M2 from a second video data stream 52. In the mixing 50 of encoded macroblocks M1, M2, original macroblocks M1 of the first video data stream 51 are illustrated in FIG. 12 in a matrix of 8×10 macroblocks M1, that is, a matrix with eight rows and ten columns. The matrix of macroblocks M1 can have any particular number of macroblocks M1 in line and column format. In the mixing of encoded macroblocks M1, M2 shown in FIG. 12, the macroblocks M1 of the first video data stream consist of original macroblocks of the first, entering video data stream. The macroblocks M2 of the incoming second video data stream however, consist of skipped macroblocks ("skip" mode), since the original macroblocks of the entering, second video data stream are not available in time for mixing with the original macroblocks M1 of the entering, first video data stream. Consequently, in the arrangement illustrated schematically in FIG. 12, original macroblocks M1 adjoin artificially encoded, inserted macroblocks M2 for mixing of the macroblocks M1 of the first, entering video data stream and the macroblocks M2 of the second, entering video data stream. With respect to a more precise description of the video mixing at the macroblock level (for example, with respect to entropy decoding and re-encoding), we refer to the technical teaching contained in document WO 2009/049974 A2.

As was already explained in connection with the description of FIG. 5, motion vectors for skipped macroblocks encoded macroblocks neighboring the skipped macroblocks are calculated which are encoded in time before the skipped macroblocks. Therefore, in the schematic configuration shown in FIG. 12 it would be a disadvantage adjoining macroblocks M1 of the first video data stream for a calculation of the skipped macroblocks M2 of the second video data stream. In a mixing of macroblocks of a first video data stream and of a second video data stream, therefore, the calculation of the motion vectors for the skipped macroblocks differs from the calculation of the motion vectors for skipped macroblocks in the case of a single, not-mixed data stream. For instance, if macroblocks M1 of the first video data stream are used for calculation of the motion vectors for the skipped macroblocks M2 in the schematic arrangement shown in FIG. 12 of a mixture of encoded macroblocks M1, M2, then the calculated motion vectors would be set to zero for the skipped macroblocks. Therefore, the motion information for the skipped macroblocks M2 of the second, arriving video data stream 52 is encoded explicitly, for example, by the use of a regular P-macroblock mode with segmenting for the original macroblocks of 16×16 macroblocks used for calculation of the motion vectors, that is, the greatest segmenting in the H.264/AVC video coding standard. For the skipped macroblocks calculated in this manner, the motion vectors are adjusted implicitly such that the motion vectors are set to zero. The data rate for original macroblocks calculated in this manner is indeed greater than the data rate of a non-mixed video data stream, but is small in comparison to the data rate of non-skipped macroblocks.

Figure 13:
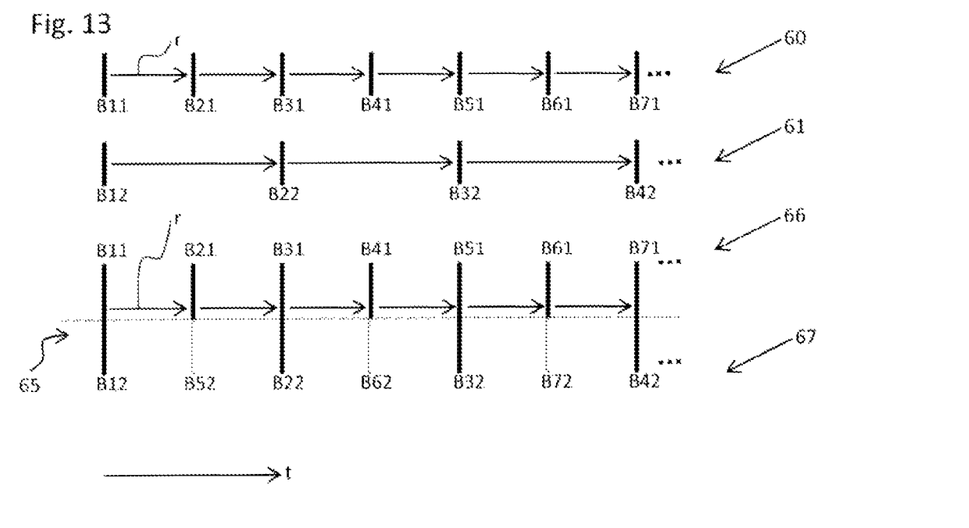

The insertion of macroblocks with "skip" mode can be used in an advantageous manner to resample video image sequences, for example, in order to mix two or more video image sequences with different sampling frequencies. As an illustration, schematic sequences 60, 61, 66, 67 of pre-calculated images of a first video data stream and of a second video data stream are illustrated in FIG. 13 before a resampling and mixing 60, 61, and after the resampling and mixing 66, 67. The schematic sequence of pre-calculated images 60 of a first video data stream displays, for example, a sampling frequency of from 30 fps (frames per second), whereas the schematic sequence 61 of pre-calculated images of a second video data stream displays a sampling frequency of 15 fps. Due to the sampling frequency of the second video data stream being half that of the first video data stream, then artificially encoded, pre-calculated images B21, B41, B61 are arranged between the ¾ images B12, B22, B32, B42 of the second video data stream. To compensate for the different sampling frequencies of the first video data stream and of the second video data stream, in the second video data stream— as shown by the schematic sequence 67 in FIG. 13—artificially encoded individual video images B52, B62, B72 are arranged between the existing individual images B12, B22, B32, B42 in such a manner that the inserted, artificially encoded individual images are design as individual reference images. Due to the design of the artificially encoded, inserted individual images B52, B62, B72 the advantage is that the prediction structure of the mixed video data streams corresponds to that prediction structure of the first arriving video data stream, as shown in the schematic sequence 60 in FIG. 13. Therefore the prediction structure of the mixed video data streams 1 and 2 have a linear prediction structure. For a simplified representation, in the schematic sequence of pre-calculated images 60, 61 in FIG. 13, it is assumed that the ratio of the sampling frequencies of the first arriving video data stream and of the second arriving video data stream is a natural number. However, the method illustrated in FIG. 13 for mixing of a first arriving video data stream and of a second arriving video data stream into one output video data stream with a sampling frequency which is accommodated to the greater sampling frequency of the first arriving video data stream or of the second arriving video data stream, is possible at any ratio of sampling frequencies of the first arriving video data stream and of the second arriving video data stream. So for example, in the configuration illustrated in FIG. 13 of schematic sequences of pre-calculated images, an individual image of the video data stream not available at any particular time, can be inserted [into] the video data stream with the lower sampling frequency; an individual image composed of skipped macroblocks can be inserted into the video data stream with the lower sampling frequency, as already explained for FIG. 13 above.

Due to the use of a device for modification of an encoded data stream of data packets in the encoded domain, in comparison to a solution with a jitter buffer, a reduced delay of the data stream with the compensated jitter can be achieved. A prior art jitter buffer inserts the maximum available delay in the data stream between two sequentially encoded data packets in the data stream. The device for compensation of jitter in the encoded domain however, has additional means for compensation of different kinds of jitter, for example, delay jitter, due to the insertion of encoded data packets into and/or the removal of existing data packets from the data stream.

In comparison to the method using a transcoder for compensation of jitter, the method using a device for modification of an encoded data stream of data packets in the encoded domain features a less extensive intervention in the data stream since in contrast to the method using a transcoder (decoding and renewed encoding) only skipped macroblocks plus additional, not recoded data packets can be encoded. Furthermore, in comparison to the method for compensation of jitter in the encoded domain by means of a transcoder in which all encoded data packets are decoded and then re-encoded, a lesser delay of the data stream will occur. The reason for this lies in the significant delay in the data stream which is produced by the signal processing in the transcoder method, because all encoded data packets have to be fully decoded and then fully re-encoded. The delay associated with this high degree of signal processing is avoided in the method using a device for compensation of jitter in the encoded domain plane in that not all data packets are decoded and encoded, but rather only a few, artificially encoded data packets, for example, in the form of skipped macroblocks as individual reference images or as individual, non-reference images, in the otherwise untreated, encoded data stream.

In contrast to the method using a transcoder, in the method for modification of an encoded data stream of data packets using a device for modification of an encoded data stream of data packets in the encoded domain, no loss of quality occurs in the encoded data packet being transmitted. Whereas in the method using a transcoder, the quality of the encoded data stream suffers due to the decoding and renewed encoding of each encoded data packet of the data stream, the not artificially encoded data packets are not changed by a compensation of jitter in the encoded domain.

We claim:

1. A method for modification of an encoded data stream of data packets of a video stream sent by a sending apparatus to a receiving apparatus, the data packets comprising first, second, third, fourth and fifth data packets wherein each data packet comprises one information bit in which information of sequential data packets exhibits time intervals from each other such that at least one time interval between sequentially sent data packets vary from a desired time interval, the method comprising:
   inserting an artificially encoded; sixth data packet into the encoded data stream in an encoded domain temporally after the second data packet, the sixth data packet artificially encoded to reference an image of the second data packet such that data content of the sixth data packet repeats data content of the second data packet; and
   removing the fourth data packet present in the encoded data stream from the encoded data stream such that the fourth data packet is not transmitted to the receiving apparatus when decoding of the fifth data packet does not depend on data content of the fourth data packet.

2. The method of claim 1, comprising generating the artificially encoded sixth data packet in the encoded domain by a jitter compensation device, said artificially encoded sixth data packet comprising a first information bit that references a second information bit of the second data packet; and wherein the sixth data packet is inserted into the encoded data stream temporally after the second data packet in the desired time interval to the second data packet when the third data packet following the second data packet is available in a time interval to the second data packet that is greater than the desired time interval.

3. The method of claim 1, comprising:
   interim-saving a number of the data packets in a jitter buffer temporarily before the insertion of the artificially encoded sixth data packet into the encoded data stream or before the removal of the fourth data packet from the encoded data stream; and managing the insertion of the artificially encoded sixth data packet into the encoded data stream or the removal of the fourth data packet from the encoded data stream such that the number of data packets interim-saved in the jitter buffer is adjustable.

4. The method of claim 2, wherein the fourth data packet is passed along to the receiving apparatus when decoding of the fifth data packet depends on data content of the fourth data packet.

5. The method of claim 1, comprising switching off a deblocking filter in a decoding loop during the generation of the artificially encoded sixth data packet.

6. The method of claim 1, wherein the artificially encoded sixth data packet comprises a portion of an individual video image which is inserted as a member of the group consisting of an individual, non-reference image and an individual, reference image.

7. The method of claim 1, comprising a jitter compensation device in the encoded domain removing the fourth data packet from the encoded data stream when the fifth packet following the fourth packet is available in the desired time interval to the third data packet that precedes the fourth data packet.

8. The method of claim 1, wherein the fourth data packet defines an individual, non-reference image.

9. The method of claim 1, wherein the sixth data packet is inserted dynamically and the fourth data packet is removed dynamically by a jitter compensation device in the encoded domain.

10. The method of claim 1, wherein the first, second, third, fourth and fifth data packets are sequentially sent one after the other by the sending apparatus to the receiving apparatus such that the first data packet is sent before the second data packet, the second data packet is sent before the third data packet, the third data packet is sent before the fourth data packet, and the fourth data packet is sent before the fifth data packet.

11. A method for modification of an encoded data stream of data packets, wherein each data packet comprises one information bit in which information of sequential data packets exhibits time intervals from each other which vary from desired time intervals and which are adapted to desired time intervals by:
   inserting an artificially encoded, first data packet into the encoded data stream in an encoded domain temporally after a second data packet; or removing a fourth data packet present in the encoded data stream from the encoded data stream in the encoded domain;

wherein the encoded data stream is a video data stream and the fourth data packet removed from the video data stream comprises a portion of an individual, non-reference image; and in the event of a linear prediction structure, removing from the lowest-time level from the video data stream only one data packet with a portion of a last individual video image of a group of pictures, and in the event of a hierarchical prediction structure, a data packet with a portion of an individual video image.

12. A method for modification of an encoded data stream of data packets, wherein each data packet comprises one information bit in which information of sequential data packets exhibits time intervals from each other which vary from desired time intervals and which are adapted to desired time intervals by:

inserting an artificially encoded, first data packet into the encoded data stream in an encoded domain temporally after a second data packet; or removing a fourth data packet present in the encoded data stream from the encoded data stream in the encoded domain;

wherein the encoded data stream is a video data stream, wherein each data packet of the encoded data stream comprises a portion of an individual video image and the artificially encoded, first data packet comprises a portion of an individual video image which comprises the information of the individual video image of the second data packet without a member of the group consisting of motion vectors and transformation coefficients; and the desired time intervals of a second video data stream correspond to the time intervals between sequential, encoded, individual images of a first video data stream, mixing a first individual video image of the artificially encoded, first data packet of the second video data stream with a first individual video image of a encoded data packet of the first video data stream to obtain an individual video image.

13. The method of claim 12, wherein the second video data stream displays a lower sampling frequency than the first video data stream; the method also comprising:

inserting an artificially encoded, first individual video image into the second video data stream at a lower sampling frequency, in comparison to the first video data stream, such that the second video data stream with the inserted, artificially encoded, first individual video image displays the sampling frequency of the first video data stream.

14. The method of claim 12, wherein each data packet of the video data stream comprises a portion of an individual video image encoded according to a video coding standard selected from the group consisting of H.264/AVC, H.263 and MPEG-4 Visual, wherein the artificially encoded, first data packet comprises a portion of an individual video image which is composed of skipped macroblocks.

15. A system comprising:
a sending apparatus;
a receiving apparatus; and
a jitter compensation device, the jitter compensation device configured to provide compensation of jitter within an encoded domain between the sending apparatus and the receiving apparatus;

wherein the sending apparatus transmitting an encoded data stream of data packets of a video stream to the receiving apparatus, the data packets comprising first, second, third, fourth and fifth data packets that are sequentially sent one after the other such that the first data packet is sent before the second data packet, the second data packet is sent before the third data packet, the third data packet is sent before the fourth data packet, and the fourth data packet is sent before the fifth data packet, wherein each data packet comprises one information bit in which information of sequential data packets exhibits time intervals from each other such that at least one time interval between sequentially sent data packets vary from a desired time interval;

the jitter compensation device receiving the data packets and inserting an artificially encoded sixth data packet into the encoded data stream temporally after the second data packet, the sixth data packet artificially encoded to reference an image of the second data packet such that data content of the sixth data packet repeats data content of the second data packet; and the jitter compensation device removing the fourth data packet present in the encoded data stream from the encoded data stream such that the fourth data packet is not transmitted to the receiving apparatus when decoding of the fifth data packet does not depend on data content of the fourth data packet and when the fifth packet following the fourth packet is available in the desired time interval to the third data packet that precedes the fourth data packet.

16. The system of claim 15, wherein the sixth data packet defines an individual, non-reference image.

17. The system of claim 15, wherein the fourth data packet defines an individual, non-reference image.

18. The system of claim 15, wherein the first, second, third, fourth, and fifth data packets each defines an image of a group of pictures.

* * * * *